(12) United States Patent
Wexler et al.

(10) Patent No.: US 8,633,942 B2
(45) Date of Patent: Jan. 21, 2014

(54) VIEW GENERATION USING INTERPOLATED VALUES

(75) Inventors: Yonatan Wexler, Redmond, WA (US); Eyal Ofek, Redmond, WA (US); Blaise Hilary Aguera y Arcas, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 711 days.

(21) Appl. No.: 12/795,031

(22) Filed: Jun. 7, 2010

(65) Prior Publication Data

US 2011/0298801 A1 Dec. 8, 2011

(51) Int. Cl.
*G09G 5/00* (2006.01)

(52) U.S. Cl.
USPC ........... 345/606; 345/619; 345/629; 345/639; 345/640; 345/643; 345/581; 345/428; 382/226; 382/260

(58) Field of Classification Search
None
See application file for complete search history.

(56) References Cited

U.S. PATENT DOCUMENTS

| | | | |
|---|---|---|---|
| 6,539,126 | B1 | 3/2003 | Socolinsky et al. |
| 6,791,540 | B1 | 9/2004 | Baumberg |
| 7,236,628 | B2 | 6/2007 | Chen et al. |
| 7,583,275 | B2 | 9/2009 | Neumann et al. |
| 2006/0251324 | A1 | 11/2006 | Bachmann et al. |
| 2011/0129164 | A1 | 6/2011 | Lin et al. |

FOREIGN PATENT DOCUMENTS

WO 0133511 A2 5/2001

OTHER PUBLICATIONS

"View interpolation for image synthesis" Shenchang Eric Chen, Lance Williams. Sep. 1993. SIGGRAPH '93: Proceedings of the 20th annual conference on Computer graphics and interactive technique.*
Levinshtein, et al., "TurboPixels: Fast Superpixels Using Geometric Flows", Retrieved at << http://www.cs.toronto.edu/~kyros/pubs/09.pami.turbopixels.pdf >>, IEEE Transactions on Pattern Analysis and Machine Intelligence, vol. 31, No. 12, Dec. 2009, pp. 1-9.
Caselles, et al., "Geodesic Active Contours", Retrieved at << http://citeseerx.ist.psu.edu/viewdoc/download?doi=10.1.1.21.2196&rep=rep1&type=pdf >>, Fifth International Conference on Computer Vision (ICCV'95), Massachusetts Institute of Technology, Jun. 20-23, 1995, pp. 1-27.
Lorigo, et al., "Codimension-Two Geodesic Active Contours for the Segmentation of Tubular Structures" In Proceedings of International Conference on Information Processing in Medical Imaging, 2000, pp. 8.

(Continued)

*Primary Examiner* — Antonio A Caschera
(74) *Attorney, Agent, or Firm* — Microsoft Corporation

(57) ABSTRACT

Images provide rich information regarding what they depict. For example, an image may have additional information, such as depth and/or 3D location values, for some points within the image. It may be advantageous to extrapolate the values from the valued points to the entire image because a new view of the image may be generated based upon values of points. Accordingly, an interpolated image may be generated by interpolating values for unvalued points based upon values of valued points. In particular, a set of valued points having desired cost paths may be determined for an unvalued point. A model may be applied to the set of valued points to interpolate a value for the unvalued point. One or more interpolated images may be projected onto a new view. In particular, points within an interpolated image may be projected onto locations within the new view based upon values of the points.

20 Claims, 11 Drawing Sheets

(56) References Cited

OTHER PUBLICATIONS

Iwanowski, et al., "Morphological Interpolation and Color Images", Retrieved at << http://ieeexplore.ieee.org//stamp/stamp.jsp?tp=&arnumber=00797570 >>, ICIAP, Proceedings of the 10th International Conference on Image Analysis and Processing, Sep. 27-29, 1999, pp. 3.

Omer, et al., "The Bottleneck Geodesic: Computing Pixel Affinity", Retrieved at << http://www.cs.huji.ac.il/~werman/Papers/364_omer_i.pdf >>, CVPR, Proceedings of the 2006 IEEE Computer Society Conference on Computer Vision and Pattern Recognition, vol. 2, Jun. 17-22, 2006, pp. 7.

Yoon, et al., "Regularized Image Sequence Interpolation by Fusing Low Resolution Frames:", Retrieved at << http://ieeexplore.ieee.org//stamp/stamp.jsp?tp=&arnumber=00818660 >>, TENCON 99. Proceedings of the IEEE Region 10 Conference, Dec. 1999, pp. 1271-1274.

"Mathematical Morphology and Image Interpolation", Retrieved at << http://cmm.ensmp.fr/~beucher/interpol/interpol.html >>, Retrieved Date: Dec. 21, 2009, pp. 3

Criminisi, et al., "GeoS: Geodesic Image Segmentation", Retrieved at << http://research.microsoft.com/pubs/71446/Criminisi_eccv2008.pdf >>, Lecture Notes In Computer Science, vol. 5302, Proceedings of the 10th European Conference on Computer Vision: Part I, Oct. 12-18, 2008, pp. 99-12.

Szeliski, Richard., "Locally Adapted Hierarchical Basis Preconditioning", Retrieved at << http://research.microsoft.com/pubs/70280/tr-2006-38.pdf >>, International Conference on Computer Graphics and Interactive Techniques, ACM SIGGRAPH, Jul. 30-Aug. 3, 2006, pp. 39.

Mahajan, et al., "Moving Gradients: A Path-based Method for Plausible Image Interpolation", Retrieved at << http://graphics.tu-bs.de/colloquium/MovingGradients.pdf >>, ACM Transactions on Graphics (TOG), Proceedings of ACM SIGGRAPH 2009, vol. 28, No. 3, Aug. 2009, pp. 23.

Xiao, et al., "View Interpolation for Dynamic Scenes", Retrieved at << http://citeseerx.ist.psu.edu/viewdoc/summary?doi=10.1.1.8.2790 >>, 2002, pp. 10.

Shiroma, et al., "Dynamic Scene View Interpolation with Multiple Moving Objects using Layered Representation", Retrieved at << http://ieeexplore.ieee.org/stamp/stamp.jsp?tp=&arnumber=1389642 >>, Proceedings. 2004 IEEE/RSJ International Conference on Intelligent Robots and Systems, (IROS 2004), vol. 2, Sep. 28-Oct. 2, 2004, pp. 1710-1715.

Vedula, et al., "Image-Based Spatio-temporal Modeling and View Interpolation of Dynamic Events", Retrieved at << http://delivery.acm.org/10.1145/1070000/1061351/p240-vedula.pdf?key1=1061351&key2=0319466621&coll=GUIDE&dl=GUIDE&CFID=78684996&CFTOKEN=76711719 >>, ACM Transactions on Graphics (TOG), vol. 24, No. 2, Apr. 2005, pp. 240-261.

Saito, et al., "View Interpolation of Multiple Cameras Based on Projective Geometry", Retrieved at << http://citeseerx.ist.psu.edu/viewdoc/summary?doi=10.1.1.6.5162 >>, In International Workshop on Pattern Recognition and Understanding for Visual Information, 2002, pp. 6.

Rander, et al., "Recovery of Dynamic Scene Structure from Multiple Image Sequences", Retrieved at << http://ieeexplore.ieee.org/stamp/stamp.jsp?arnumber=00572192 >>, Proceedings of the IEEE/SICE/RSJ International Conference on Multisensor Fusion and Integration for Intelligent Systems, 1996, pp. 305-312.

Kanade, et al., "Virtualized Reality: Perspectives on 4D Digitization of Dynamic Events", Retrieved at << http://ieeexplore.ieee.org/stamp/stamp.jsp?arnumber=4178158 >>, IEEE Computer Graphics and Applications, vol. 27, No. 3, May 2007, pp. 32-40.

Kim, et al., "Multi-view Image and ToF Sensor Fusion for Dense 3D Reconstruction", Retrieved at << http://www.mpi-inf.mpg.de/~theobalt/3dim09.pdf >>, IEEE Workshop on 3-D Digital Imaging and Modeling, (3DIM), 2009, pp. 8.

Non-Final Office Action cited in U.S. Appl. No. 12/794,982 dated Sep. 26, 2012, 19 pgs.

"A Note on Two Problems in Connexion with Graphs", E. W. Dijkstra, Numerische Mathematik 1, pp. 269-271, 1959.

"Graph Models for Social Relations", V. Yegnanarayanan and G.K. Umamaheswari, Electronic Notes in Discrete Mathematics 33, 2009, pp. 101-108.

"Fast and Accurate Geodesic Distance Transform by Ordered Propagation", Ruben Cardenes, Carlos Alberola-Lopez and Juan Ruiz-Alzola, Image and Vision Computing 28, 2010, pp. 308-316.

Reply Non-Final Office Action cited in U.S. Appl. No. 12/794,982 dated Dec. 26, 2012, 12 pgs.

Notice of Allowance cited in U.S. Appl. No. 12/794,982 dated Jan. 18, 2013, 20 pgs.

Supplemental Notice of Allowance cited in U.S. Appl. No. 12/794,982 dated Apr. 12, 2013, 4 pgs.

* cited by examiner

| | VALUED POINT #1 | COST PATH #1 | VALUED POINT #2 | COST PATH #2 | ... | VALUED POINT #K | COST PATH (#K) |
|---|---|---|---|---|---|---|---|
| UNVALUED POINT (1) | VP (3) | 5 | VP (5) | 12 | ... | VP (6) | 14 |
| UNVALUED POINT (2) | VP (3) | 4 | VP (13) | 6 | ... | VP (8) | 16 |
| UNVALUED POINT (3) | VP (8) | 1 | VP (11) | 33 | ... | VP (91) | 50 |
| UNVALUED POINT (4) | VP (5) | 5 | VP (2) | 7 | ... | VP (7) | 15 |
| ... | ... | ... | ... | ... | ... | ... | ... |
| UNVALUED POINT (N) | VP (3) | 7 | VP (8) | 34 | ... | VP (1) | 40 |

INTERPOLATED TABLE — 502

VIEW GENERATION USING INTERPOLATED VALUES

BACKGROUND

Digital images play a prevalent role in current computing applications. For example, users may upload, alter, and share digital photos; advertising companies may generate digital images for online advertisements; mapping applications may comprise satellite images of various locations on earth; etc. In some instances, digital images may be generated where specific points of the image have known values. In one example, a camera may capture a dense sampling of a scene. A stereo process may recover depth information at some, but not all, of the points within the image. In another example, color information of an image may be known at a few specific points within the image (e.g., a user provides brush strokes of color on various regions of objects, such as a brown stroke near a chair and a red stroke near an apple). However, some information may still be missing from such images.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Among other things, one or more systems and/or techniques for generating a new view are disclosed herein. An image may comprise points representing pixels. Valued points may comprise values representing depth, position, and/or 3D location data. Values of valued points may have been determined based upon manual user entry, a stereo process, a frame bundling process, etc. It may be appreciated that values may be used to determine locations of points within an image and/or a new view of an image. Typically, not all points within the image will have known values. That is, an image may comprise valued points and unvalued points, where an unvalued point lacks a value. For example, some pixels may be valued points, while the majority of pixels are unvalued points.

Values for unvalued points may be interpolated based upon values of valued points within the image. In particular, for respective unvalued points, a set of valued points may be determined for an unvalued point. It may be appreciated that values may relate to depth, position, and/or 3D location data. The set of valued points may comprise valued points having desired cost paths. It may be appreciated that a cost may represent a difference between two points, such as a color difference, a texture difference, a gradient difference, a reflectance, etc. A cost path may represent a cost to "travel" from an unvalued point to a valued point based upon traveling through a path of adjacent points within the image (e.g., a cost path from A to C may be a cost from unvalued point A to unvalued point B+a cost from unvalued point B to valued point C). For example, a desired cost path may be path of points from an unvalued point to a valued point, where the sum of costs between points along the path is small (e.g., a small change in color between points along a path from an unvalued point to a valued point).

It may be appreciated that there may be an increased probability that an unvalued point may have a value similar to a valued point where there is a desired low cost path between the unvalued point and the valued point. For example, if there is a desired low cost path of points between a green colored unvalued point and a green colored valued point of depth 50 cm (e.g., points along the desired low cost path have a small change in the color green), then there may be an increased probability that both points are part of a similar object, and that the green colored unvalued point has a depth similar to the 50 cm depth of the green colored valued point. In this way, the set of valued points may comprise a predetermined number (k) of valued points having a desired cost path represented by a desired (e.g., small) change in color, texture, gradient, reflectance, and/or other similarity measurements between points along a path from the unvalued point to the valued point.

A model may be applied to a set of valued points associated with an unvalued point to interpolate a value for the unvalued point. In one example, an average of the values for the valued points within the set of valued points may be interpolated as the value for the unvalued point. In another example, a plane intersecting the valued points within the set of valued points may be used to interpolate the value for the unvalued point. It may be appreciated that a variety of models are contemplated as falling within the scope of the claimed subject matter (e.g., a variety of geometric shapes). In this way, an interpolated image comprising valued points having values and unvalued points having values interpolated based upon one or more valued points within the image may be generated.

A new view may be generated based upon projecting points from within the interpolated image to locations within the new view. A point may be project to a location based upon a value of the point (e.g., a depth and/or 3D location value). In one example, forward mapping assignment of color values may be used to project points. In another example, backward mapping assignment of depth values may be used to project points. It may be appreciated that feature recognition techniques may be utilizes to determine features between the interpolated image and the new view, which may aid in determining locations within the new view of projected points. Additional information may be used to determine locations. For example, a desired "camera" viewing angle for the new view may be used in determining locations within the new view to project points.

It may be appreciated that one or more images may be utilized in generating a new view. That is, a fused new view may be generated based upon independently projecting interpolated images onto a new view. It may be appreciated that a z-buffer, relevance measure, a time measure, a quality measure, and/or other image information may be used to generate the fused new view. For example, a weight may be assigned to interpolated images and/or points therein to determine how much values of the interpolated images and/or points therein contribute to the projection of points to locations within the fused new view.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DESCRIPTION OF THE DRAWINGS

FIG. 5 is an illustration of an example of an interpolated table.

DETAILED DESCRIPTION

Figure 1:
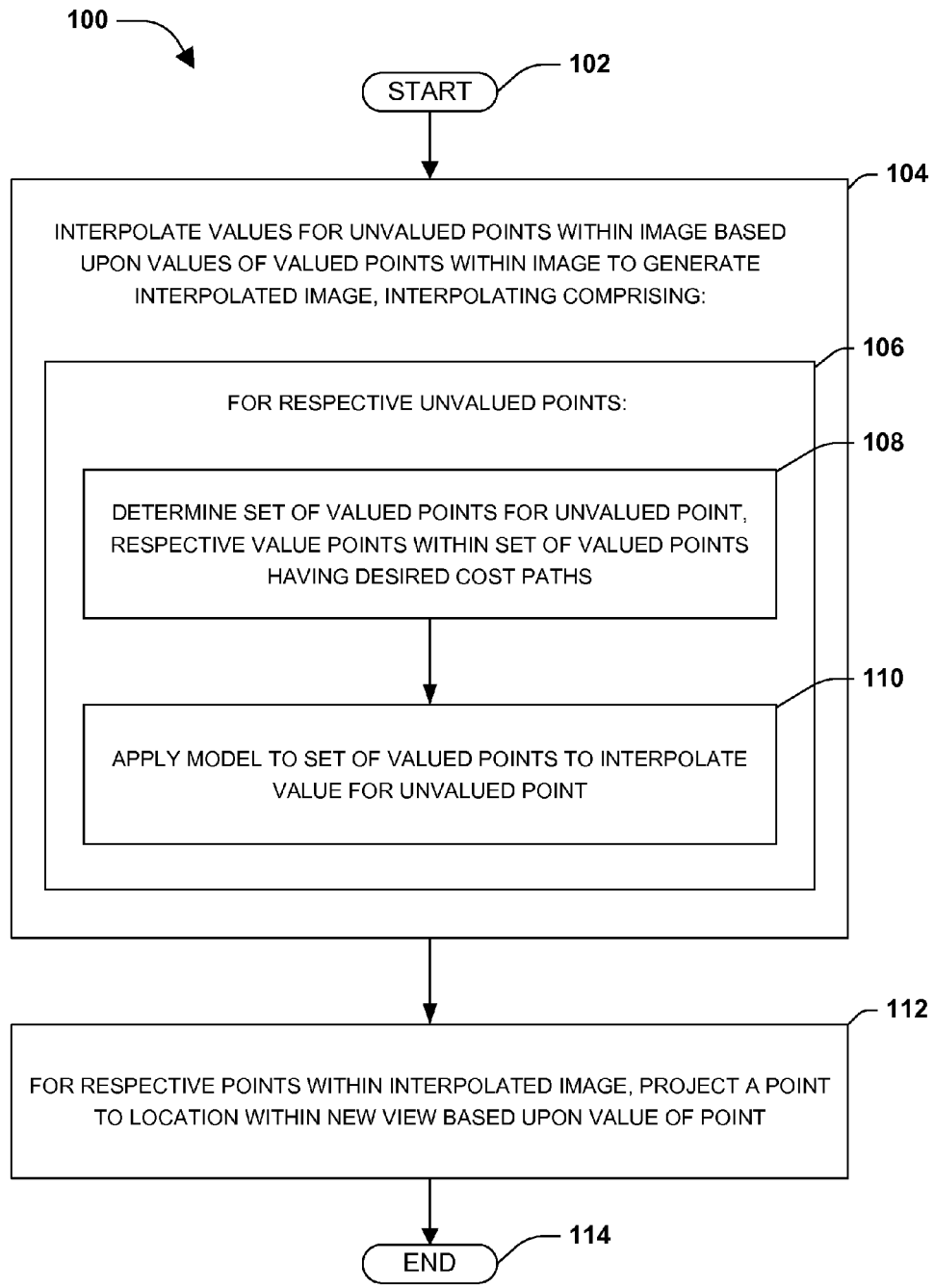
FIG. 1 is a flow chart illustrating an exemplary method of generating a new view.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

Many images contain rich information regarding what the images depict. For example, texture, color, depth, and/or a variety of other data may be known. Unfortunately, this additional image information may be sparse. That is, depth values may be known for some, but not all, pixels and/or objects within an image. If enough additional information is known or determinable, then images with additional information may be used to generate new views of what is depicted by the images. That is, the additional image information, such as depth, may be used to project points from the image into locations within a new view of the image. In one example, an image may depict a scene of a room. A new view depicting the room from a different angle may be derived from the image (e.g., depth, 3D location, and/or color data may be used to determine where objects belong in the new view). In another example, five sequential images depicting a person walking down a crowded sidewalk may be used to determine additional new views of the sidewalk scene. The five sequential views and the new views may be used to generate motion of the person walking down the sidewalk. In another example, a few images of a car may be used to generate new views of the car. In this way, a real-time virtual "walk around tour" of the car may be generated from the original few images and the new views.

One current technique for new view generation is to generate a new view directly from the input images without generating a 3D model as an intermediate stage. The technique may specify how pixels within the new view should be colored based upon the input image. Some pixels may be easy to match. However, the challenge is to spread the matched information to unmatched pixels. Another current technique may attempt to generate a model based upon the input images. For example, a stereo reconstruction may be used to determine geometry, such that textures may be project onto the geometry. However, generating a good model may be a difficult because points may be hard to match (e.g., untextured points) and/or invisible due to occlusion. For example, artifacts may be generated where pixels have unknown data.

Accordingly, one or more systems and/or techniques for generating a new view based upon one or more input images are provided herein. An input image may lack a complete set of information regarding a particular feature of the image. For example, depth, position and/or 3D location information may be known for some, but not all, pixels within the image. Geodesic affinity may be leveraged to "fill in" the missing values. In particular, values of valued points within an image may be used to interpolate values for unvalued points. In this way, values may be used to determine locations of points within an image and/or a new view of an image.

Geodesic affinity of an unvalued point may be interpreted as a difference measurement defined by a cost between adjacent points along a path from the unvalued point and a valued point. It may be appreciated that geodesic affinity may be referred to as desired cost paths. In particular, a set of valued points having low geodesic affinity (desired low cost paths) may be determined for the unvalued point. A desired low cost path between an unvalued point and a valued point may indicate that there is an increased probability that the unvalued point and the valued point share a similar value because the low cost (e.g., a small change in color) to travel from the unvalued point to the valued point may indicate that both points are part of a similar object within the image. For example, a valued point may have a depth value of 100 cm. A low desired cost path between an unvalued point and the valued point may be determined based upon a small change in color between points along a path between valued point and the unvalued point (e.g., the valued pixel may be green, the unvalued pixel may be dark green, and adjacent pixels along a path from the valued pixel to the unvalued pixel may be greenish color, thus it may be determined that the valued pixel and the unvalued pixel are part of a green object having a uniform depth). It may be appreciated that geodesic affinity (e.g., a desired cost path between points) may not be based upon an actual distance between the points, but rather may be based upon difference measurements between points.

One embodiment of generating a new view is illustrated by an exemplary method 100 in FIG. 1. At 102, the method begins. At 104, an interpolated image may be generated by interpolating values for unvalued points within an image based upon values of valued points within the image. In particular, at 106, for respective unvalued points, a set of valued points for an unvalued point may be determined, at 108. That is, a first set of valued points may be determined for a first unvalued point, a second set of valued points may be determined for a second unvalued point, etc. A set of valued points may comprise one or more valued points (e.g., the image may comprise 50 valued points, while 5 valued points may be determined as the set of valued points). A valued point may be included within the set of valued points based upon the valued point having a desired cost path. For example, a desired low cost path may be a path of points having a low cost to "travel" from the unvalued point to the valued point, where the cost may be defined based upon difference measurements between points along the path (e.g., a change in color or texture between points).

In one example, the set of valued points may comprise a predetermined number (k) of valued points having desired low cost paths from the unvalued point to the respective valued points. A desired low cost path may correspond to a small change in color, texture, gradient, reflectance and/or other difference measurements along a path of points between the unvalued point and the valued point. In this way, a set of valued points having desired cost paths may be determined for an unvalued point, such that there may be an increased probability that the unvalued point may have a similar value (e.g., a depth, position, and/or 3D location) as values of the valued points within the set of valued points, as opposed to valued points not included within the set of valued points. It may be appreciated that in one example, values of valued points may be determined based upon user entered values, values from a stereo process, values from a frame bundling process, and/or values derived from a variety of techniques. It may be appreciated that additional techniques, such as facial detection may be utilized in determining values for unvalued points.

It may be appreciated that cost paths may be determined based upon comparing unvalued points with neighboring unvalued points (e.g., it may be "cheaper" to travel through a first neighboring point to a first valued point, rather than traveling through a second neighboring point to the first valued point and/or a second valued point). In one example of interpolation, a dimensional array of points within an image may be generated. The dimensional array may be traversed (e.g., forward loops and/or backward loops) to generate an interpolation table comprising predetermined number (k) of valued points for respective unvalued points within the dimensional array. To determine (k) valued points having desired cost paths, the dimensional array may be traversed one or more times to compare cost paths of valued points within a set of valued points for a current point with cost paths of valued points within a set of valued points for a neighboring point. In this way, a set of valued points for a current point may be determined and/or updated based upon comparing cost paths of the current point and neighboring points.

At 110, for respective unvalued points, a model may be applied to a set of valued points associated with an unvalued point to interpolate a value for the unvalued point. It may be appreciated that a model may be a technique for deriving a single value based upon values of valued points. In one example, an average of the values for the valued points within the set of valued points may be used as the "interpolated" value for the unvalued point. In another example, a plane and/or a variety of geometric shapes intersecting the valued points within the set of valued points may be used to interpolate a value for the unvalued point.

One or more values of valued points within the set of valued points may be determined as outliers. In one example, valued points having outlier values may be removed from the set of valued points before applying the model. In this way, "interpolated" values may be assigned to unvalued points based upon relevant values to generate an interpolated image. In particular, the image may be interpreted as an interpolated image comprising valued points having values and unvalued points having "interpolated" values.

At 112, for respective points within the interpolated image, a point may be projected to a location within a new view based upon a value of the point. For example, values of unvalued points and valued points may correspond to depth, position, and/or 3D location data of the respective points. A depth value of a point may be used to determine a location of the point within the new view. In one example, a forward mapping assignment may be performed, where a color value associated the point may assigned as a color value for the location within the new view. In another example, a backward mapping assignment may be performed, where a depth value associated with the point may be assigned as the depth value for the location within the new view. It may be appreciated that a variety of projection techniques may be utilized to project points within the interpolated image to locations within the new view based upon values of the points. Additional information may be used to determine locations. For example, a desired "camera" viewing angle for the new view may be used in determining locations within the new view to project points.

It may be appreciated that a fused new view may be generated based upon multiple interpolated images. In one example, a second interpolated image may be projected onto the new view to generate a fused new view. That is, interpolated images may be project onto the new view independently to create the fused new view. For example, points within a second interpolated image may be projected to locations within a new view to generate a fused new view. In another example, a first interpolated image and a second interpolate image may be reconciled with one another, such that a single projection is performed onto a fused new view without the creation of an intermediate new view.

Weights may be assigned to interpolated images and/or points therein. A weight may correspond to a relevance measurement (e.g., how relevant an interpolated image is to a new view), a time measurement (e.g., how close in time an interpolate image is to a new view), a quality measurement (e.g., a confidence measurement regarding an accuracy or quality of an interpolated image), a z-buffer, and/or other metrics. The weight may be taken into account when generating a fused new view. For example, a first interpolated image may have a weight of 1 because the first interpolated image is close in time and/or is highly relevant to a new view. A second interpolated image may have a weight of 0.04 because the second interpolated image may be farther in time and/or less relevant than the first interpolated image. In this way, values of points within the first interpolated image may contribute more than values of points within the second interpolated image when determining locations of points within the new view. At 114, the method ends.

In one example of generating a fused new view, three or more images may be received, where an image comprises unvalued points without values and valued points having 3D location values. For respective images, sets of valued points may be determined for unvalued points within an image, where respective valued points within a set of valued points have desired low cost paths. An interpolated image may be generated based upon applying a model to the sets of valued points associated with the image. In particular, "interpolated" 3D location values may be interpolated for an unvalued point based upon applying a model to a set of valued points associated with the unvalued point. In this way, interpolated images may be generated for respective images. The interpolated images may be projected onto a fused new view based upon 3D location values of valued points and "interpolated" 3D location values of unvalued points within respective interpolated images.

Figure 2:
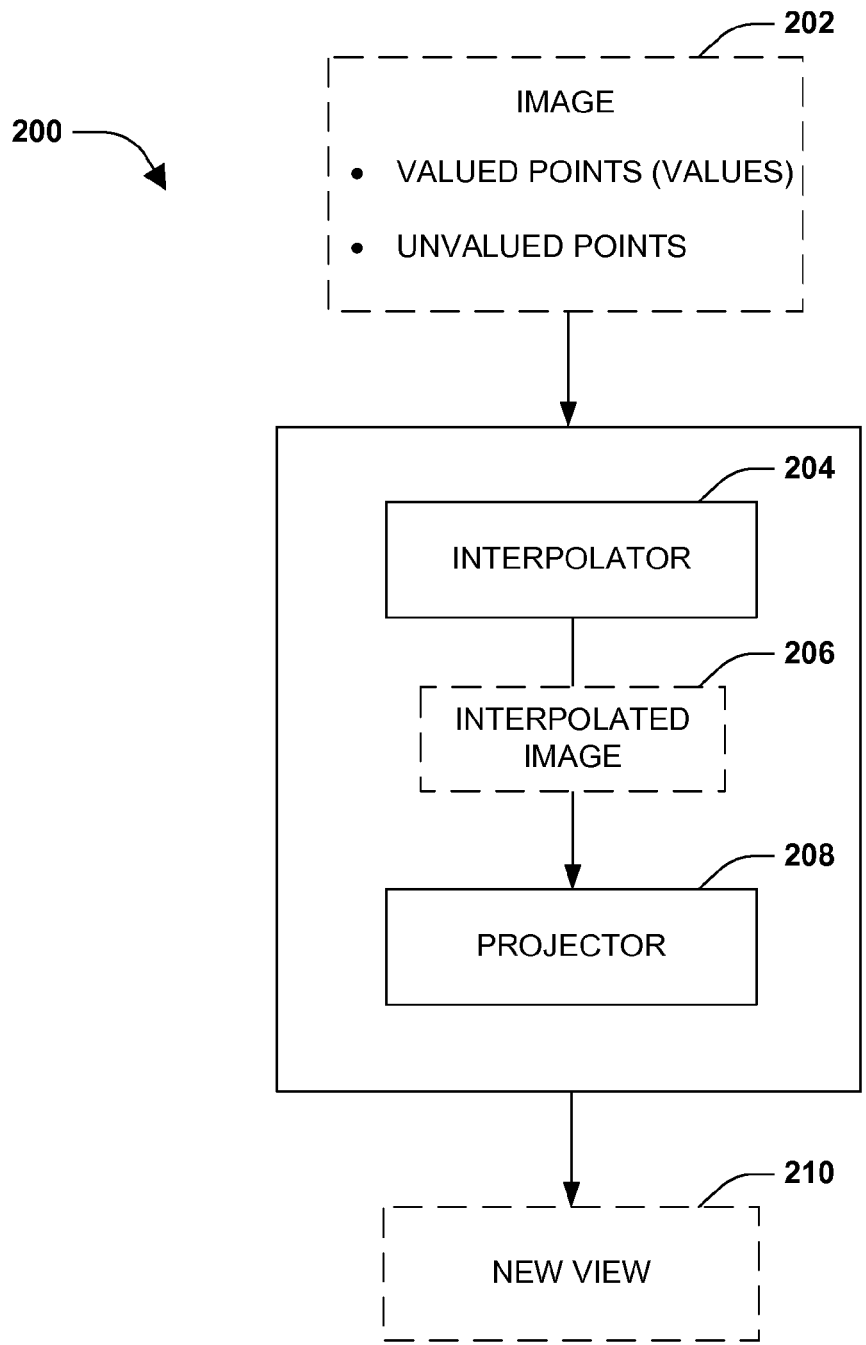
FIG. 2 is a component block diagram illustrating an exemplary system for generating a new view based upon an image.

FIG. 2 illustrates an example of a system 200 configured to generate a new view 210 based upon an image 202. The image 202 may comprise points representing pixels. A point having a value may be interpreted as a valued point. A point without a value may be interpreted as an unvalued point. A value may corresponding to a measurement associated with the image 202, such as depth, position, 3D location, and/or other information useful in determining locations of pixels within a new view. The system 200 may comprise an interpolator 204 and/or a projector 208. The interpolator 204 may be configured to generate an interpolated image 206 based upon determining values for unvalued points within the image 202 based upon values of valued points within the image 202.

The interpolator 204 may be configured to determine sets of valued points for respective unvalued points within the image 202. A set of valued points may comprise one or more valued points having desired cost paths. For example, a desired cost path may be a path having a desired low cumulative cost between points along a path from an unvalued point to a valued point (e.g., a cost path between unvalued point (1) and valued point (15) may comprise a cost from unvalued point (1) to unvalued point (6)+a cost from unvalued point (6) to unvalued point (8)+a cost from unvalued point (8) to valued point (15)). In this way, valued points having desired geodesic affinity with the unvalued point may be retained, while other valued points (e.g., a valued point having a high cost path to the unvalued point because many of the points along the path have large changes in color, texture, and/or some other measurement) may be excluded from the set of valued points. In one example, the interpolator 204 may be configured to determine a predetermined number (k) of valued points as a set of valued points, where a valued point has a desired low cost path corresponding to a small change in color, texture, gradient, and/or reflectance along a path of points between the unvalued point and the valued point. It may be appreciated that desired cost paths may be determined based upon comparing current cost paths of an unvalued point with cost paths of neighboring unvalued points, such that valued points having desired cost paths are retained for the unvalued point.

The interpolator 204 may be configured to apply a model to a set of valued points to interpolate a value for a corresponding unvalued point. In one example, the interpolator 204 may be configured to apply a model comprising an average function. The average function may be used to interpolate the value for the unvalued point based upon an average value of valued points within the set of valued points. In another example, the interpolator 204 may be configured to apply a model comprising a geometric shape intersection function and/or a plane intersection function that intersects the valued points within the set of valued points. In this way, a value may be interpolated for the unvalued point based upon the location of the unvalued point with respect to the geometric shape or plane. The interpolator 204 may be configured to remove outlier values to increase accuracy when interpolating values.

The interpolator 204 may be configured to generate the interpolated image 206 based upon values of valued points and values of unvalued points. That is, the interpolated image 206 may comprise valued points having depth, position and/or 3D location data and unvalued points having interpolated depth, position and/or 3D location data. It may be appreciated that the interpolator 204 may be configured to generate one or more interpolated images.

The projector 208 may be configured to project points within the interpolated image 206 to locations within the new view 210 based upon values of points within the interpolated image 206. In particular, depth, position, and/or 3D location values may be used to determine where to project points (pixels) from the interpolated image 206 onto the new view 210. It may be appreciated that additional information, such as matching features (e.g., a corner, an object within the image, a person within the image, etc.) between the image (image 202 and/or interpolated image 206) and the new view 210, may be used to determine projection locations. In another example, matching features between a first image (input image and/or interpolated image) and a second image (input image and/or interpolated image) may be used to determine projection locations. In another example, additional information, such as a desired "camera" viewing angle for the new view 210, may be used to determine projection locations.

Interpolated images and/or points therein may be assigned weights by the projector 208 based upon a relevance measure, a time measure, a quality measure, a z-buffer, and/or metrics. In this way, the projector 208 may generate a fused new view based upon the assigned weight. For example, a second interpolated image having a larger weight than a first interpolated image may be taken into greater consideration when projecting points to locations within the fused new view.

Figure 3:
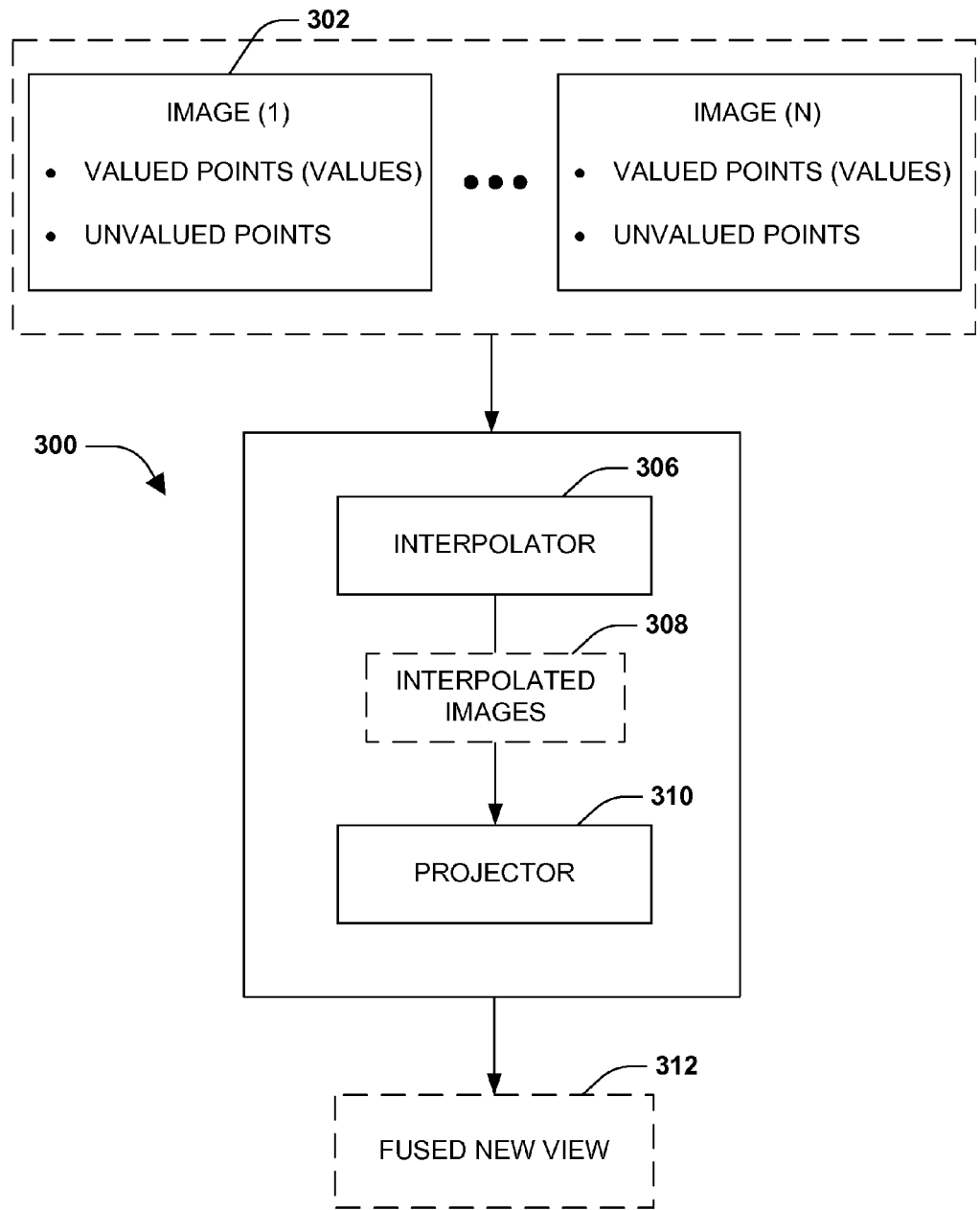
FIG. 3 is a component block diagram illustrating an exemplary system for generating a fused new view based upon a plurality of input images.

FIG. 3 illustrates an example of a system 300 configured to generate a fused new view 312 based upon a plurality of input images. The system 300 may comprise an interpolator 306 and/or a projector 310. The interpolator 306 may be configured to generate interpolated images 308 based upon a plurality of input images. For example, a first interpolated image may be generated based upon a first input image 302, a second interpolated image may be generated based upon a second input image, etc. The projector 310 may be configured to generate a fused new view 312 based upon the interpolated images 308. For example, the projector 310 may combine multiple projections of interpolated images 308 within a new view to generate the fused new view 312. Some interpolated images may contribute more than other interpolated images. In particular, weights may be assigned to interpolated images and/or points therein, where a weight corresponding to how much a particular interpolated image and/or point contributes to the fused new view 312.

In one example, the projector 310 may be configured to merge new views (e.g., projections of interpolated images) into the fused new view 312. In this way, new views may be independently projected onto the fused new view 312. In another example, a first interpolated image may be projected onto the fused new view 312, and then a second interpolated image may be project onto the fused new view 312, etc., while utilizing a z-buffer to determine final locations of points within the fused new view 312 based upon depth. It may be appreciated that a variety of projection techniques may be employed by the projector 310.

Figure 4:
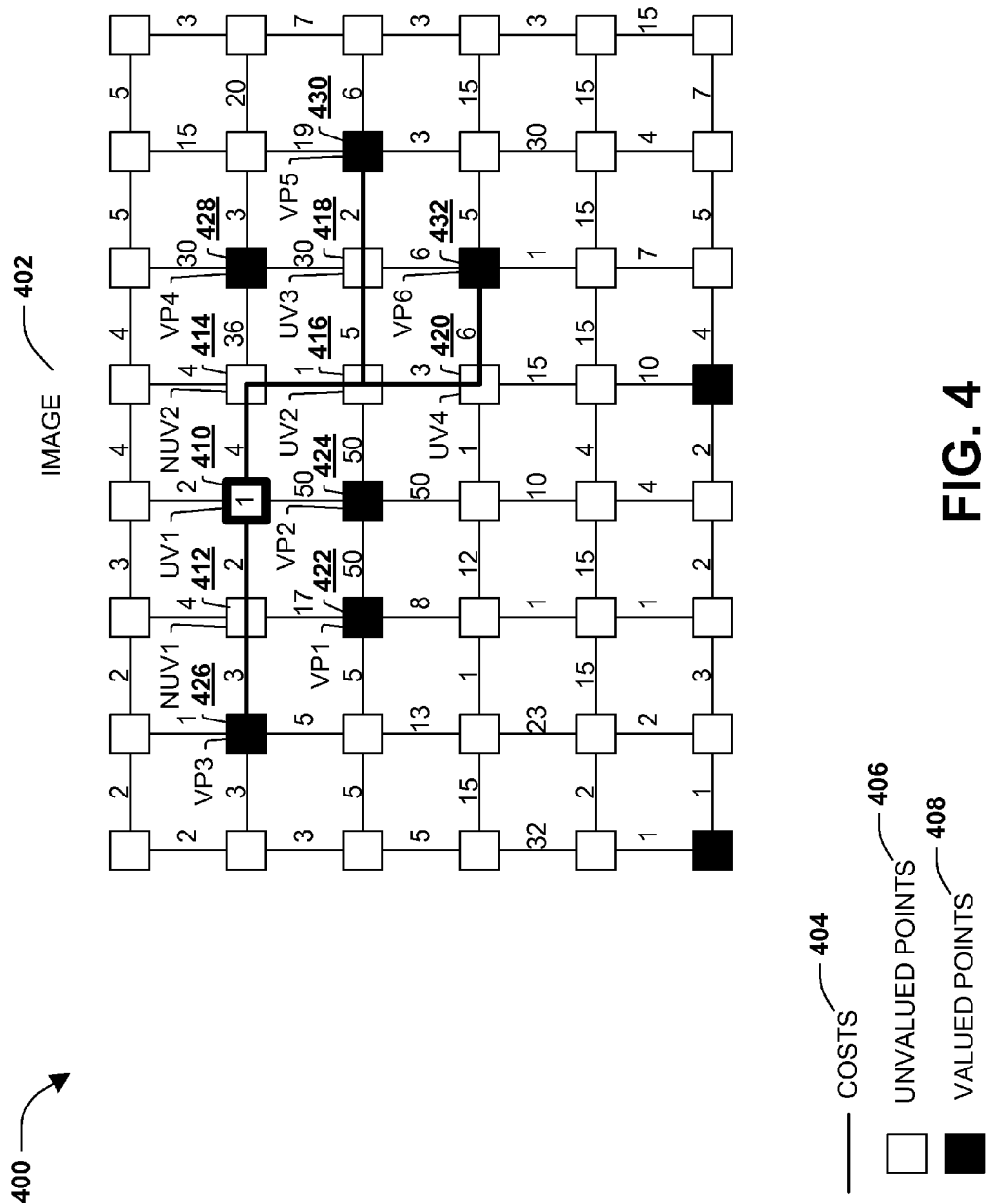
FIG. 4 is an illustration of an example of determining a set of valued points for an unvalued point within an image.

FIG. 4 illustrates an example 400 of determining a set of valued points for an unvalued point (1) 410 within an image 402. The image 402 may comprise points (pixels) having information, such as color data. Some points within the image 402 may comprise additional information, such as depth values, position values, and/or 3D location values. In particular, the image 402 may comprise unvalued points 406 having unknown values and valued points 408 having known values. For respective unvalued points 406 within the image 402, a set of valued points may be determined. For example, a set of valued points may comprise a predetermined number (k) of valued points, where a valued point has a desired low cost path between the valued point and a corresponding unvalued point. Costs 404 may be associated with edges between points within the image 402. A cost may represent a change in a measurement (e.g., color, texture, gradient, reflectance, etc.) between two points. For example, a high cost may be associated with traveling from a first point having a green color to a second point having a red color. A low cost may be associated with traveling from the second point having the red color to a third point having a crimson color. In this way, costs may reflect a probability that two points may have similar values (e.g., depth values) because points having similar color may be part of an object having uniform depth. For example, the high cost between a green point and a red point may indicate the two points reside on different objects within the image 402, and thus may have differing depth values.

It may be appreciated that unvalued points 406 within the image 402 may be traversed one or more times to determine and/or update sets of valued points associated with unvalued points. In particular, a current unvalued point may be compared with neighboring points to determine and/or update a set of valued points having desired low cost paths. For example, a current unvalued point may be associated with a set of valued points comprising 4 valued points having respective cost paths. However, the 4 valued points may be updated with new valued points and/or cost paths (e.g., a valued point may be replaced with a different valued point; a cost path of a valued point may be updated with a "more desirable" cost path based upon traveling through a different neighboring point to the valued point; etc.). In this way, the set of valued points for the current unvalued points may be updated to comprise valued points having desired low cost paths.

It will be appreciated that a particular naming convention is applied to some points in FIG. 4 to facilitate a description of a following example, but that the same points may have different designations in another example. That is, the names of points illustrated in FIG. 4 may change when another point is examined. In this example, certain points are referred to as unvalued point (1) 410, unvalued point (2) 416, unvalued point (3) 418, unvalued point (4) 420, neighboring unvalued point (1) 412, neighboring unvalued point (2) 414, valued point (1) 422, valued point (2) 424, valued point (3) 426, valued point (4) 428, valued point (5) 430 and valued point (6) 432. These designations allow various aspects (e.g., traversal through different paths/points) to be discussed.

In one example, unvalued point (1) 410 may be associated with a set of 3 valued points. Example 400 may illustrate a comparison of the unvalued point (1) 410 with neighboring points during an iteration of traversing the image 402 (e.g., a second iteration after a first iteration from which the initial set of valued points were determined). It may be appreciated that new valued points and/or cost paths may be discovered while traversing the image 402 because the unvalued point (1) 410 may be compared with neighboring points to update the set of valued points (e.g., a lower cost path to a valued point may be discovered).

The set of valued points associated with the unvalued point (1) 410 may be determined and/or updated based upon comparing the set of valued points associated with the unvalued point (1) 410 with sets of valued points of neighboring points. In one example, the unvalued point (1) 410 may be compared with neighboring unvalued point (1) 412. The neighboring unvalued point (1) 412 may have 3 valued points within a set of valued points. For example, the set of valued points for the neighboring unvalued point (1) 412 may comprise a valued point (3) 426 having a cost path of 3, a valued point (1) 422 having a cost path of 17, and another valued point having a cost path from the neighboring unvalued point (1) 412 to the valued point. A comparison between the cost paths of valued points associated with the unvalued point (1) 410 and cost paths associated with the neighboring unvalued point (1) 412 may be performed. It may be determined that a cost path from the unvalued point (1) 410 through the neighboring unvalued point (1) 412 to the valued point (3) 426 may have a desired cost path (e.g., a cost path smaller than at least one cost path of valued points within the set of valued points associated with the unvalued point (1) 410). In this way, the set of valued points associated with the unvalued point (1) 410 may be updated to comprise the valued point (3) 426 having a total cost of 5 (2+3).

The unvalued point (1) 410 may be compared with another neighboring point, such as valued point (2) 424. A cost of 50 may be associated with traveling from unvalued point (1) 410 to valued point (2) 424. For example, the unvalued point (1) 410 may have a color of white, while the valued point (2) 424 may have a color of black, thus there is a high cost between the points. In this way, the set of valued points for the unvalued point (1) 410 may not be updated because the valued points within the set of valued points may have more desired cost paths (e.g., costs below 50).

The unvalued point (1) 410 may be compared with neighboring unvalued point (2) 414. Neighboring unvalued point (2) 414 may be associated with a set of valued points comprising a valued point (5) 430 having a cost path of 8 (1+5+2), a valued point (6) 432 having a cost path of 10 (1+3+6), and another valued point having a cost from the neighboring unvalued point (2) 414 to the valued point. A comparison between the cost paths of valued points associated with the unvalued point (1) 410 and cost paths associated with the neighboring unvalued point (2) 414 may be performed. It may be determined that a cost path from the unvalued point (1) 410 through the neighboring unvalued point (2) 414 to valued point (5) 430 may have a desired cost path of 12 (4+1+5+2). In particular, the desired cost path of 12 may be derived from a cost between unvalued point (1) 410 and neighboring unvalued point (2) 414+a cost between neighboring unvalued point (2) 414 and unvalued point (2) 416+a cost between unvalued point (2) 416 and unvalued point (3) 418+a cost between unvalued point (3) 418 and valued point (5) 430. The set of valued points for the unvalued point (1) 410 may be updated with valued point (5) 430 because the cost path of 12 may be more desired (e.g., smaller) than a cost path of a valued point within the set of valued points for the unvalued point (1) 410.

Additionally, a cost path from the unvalued point (1) 410 through the neighboring unvalued point (2) 414 to valued point (6) 432 may be determined as a desired cost path because the cost path may be more desired (e.g., smaller) than a cost path of a valued point within the set of valued points for the unvalued point (1) 410. For example, there may be a low cost based upon a small change in color between points along the path from the unvalued point (1) 410 through the neighboring unvalued point (2) 414 to the valued point (6) 432. The cost path may be a cost between unvalued point (1) 410 and neighboring unvalued point (2) 414+a cost between neighboring unvalued point (2) 414 and unvalued point (2) 416+a cost between unvalued point (2) 416 and unvalued point (4) 420+a cost between unvalued point (4) 420 and valued point (6) 432.

In this way, the unvalued point (1) 410 may be compared with neighboring points during one or more traversals of the image 402 to determine a final set of valued points having desired cost paths. In one example, the set of valued points for unvalued point (1) 410 may comprise the valued point (3) 426 having a cost path of 5, the valued point (5) 430 having a cost path of 12, and the valued point (6) 432 having a cost path of 14. The set of valued points may exclude valued points (1) 422, valued point (2) 424, valued point (4) 428, and/or other valued points having less desired cost paths (e.g., cost paths greater than 14).

FIG. 5 illustrates an example 500 of an interpolated table 502. The interpolated table 502 may be associated with an image comprising valued points and unvalued points. The interpolated table 502 may comprise unvalued points (e.g., unvalued point (1), unvalued point (2), etc.). An unvalued point may be associated with a set of valued points within the interpolated table 502. For example, unvalued point (1) may be associated with a set of valued points 504. The set of valued points 504 may comprise a predetermined number (k) of valued points having desired cost paths between the unvalued point (1) and the respective valued points. For example, a desired cost path may be a desired low cost path. In this way, the set of valued points 504 may comprise valued point (3) having a cost path of 5, valued point (5) having a cost path of 12, and/or valued point (6) having a cost path of 14 because the respective cost paths may have smaller costs than costs of other paths between the unvalued point (1) and other valued points. (It will be appreciated that the set of value points 504 in FIG. 5 corresponds to the example provided in FIG. 4.) A cost path may represent a cost to "travel" from an unvalued point to a valued point, which may indicate how similar the depth, position, and/or 3D location values of the valued point and the unvalued point may be. It may be appreciated that the interpolated table 502 may be generated and/or updated based upon traversing an image (e.g., image 402 of FIG. 4). In this way, the interpolated table 502 may comprise sets of valued points for respective unvalued points.

Figure 6:
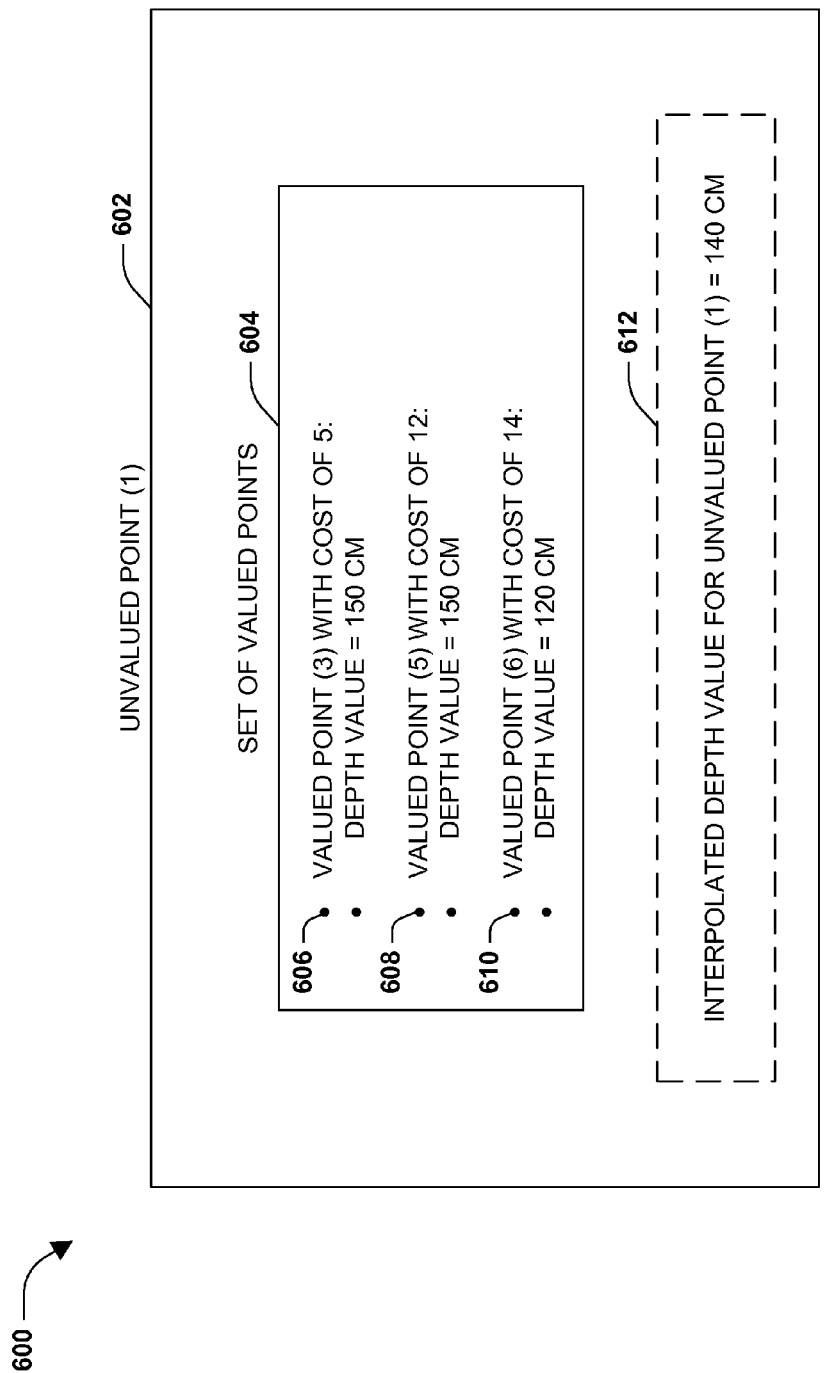
FIG. 6 is an illustration of an example of a set of valued points associated with an unvalued point.

FIG. 6 illustrates an example 600 of a set of valued points 604 associated with an unvalued point (1) 602. The set of valued points 604 may comprise 3 valued points having desired cost paths. (It will be appreciated that the set of value points 604 in FIG. 6 corresponds to the examples provided in FIGS. 4 and 5.) The set of valued points 604 may comprise a valued point (3) 606 having a cost of 5, valued point (5) 608 having a cost of 12, and valued point (6) 610 having a cost of 14. In one example, a cost path may represent a change in color between points along a path from the unvalued point (1) 602 to a valued point within an image. The valued points within the set of valued points may comprise values. For example, valued point (3) 606 may have a depth value of 150 cm, valued point (5) 608 may have a depth value of 150 cm, and valued point (6) 610 may have a depth value of 120 cm. An interpolated depth value 612 may be determined based upon applying a model to the values of valued points within the set of valued points 604. For example, an average of the values (150 cm, 150 cm, and 120 cm) may be used as the interpolated depth value 612 of 140 cm for unvalued point (1) 602.

Figure 7:
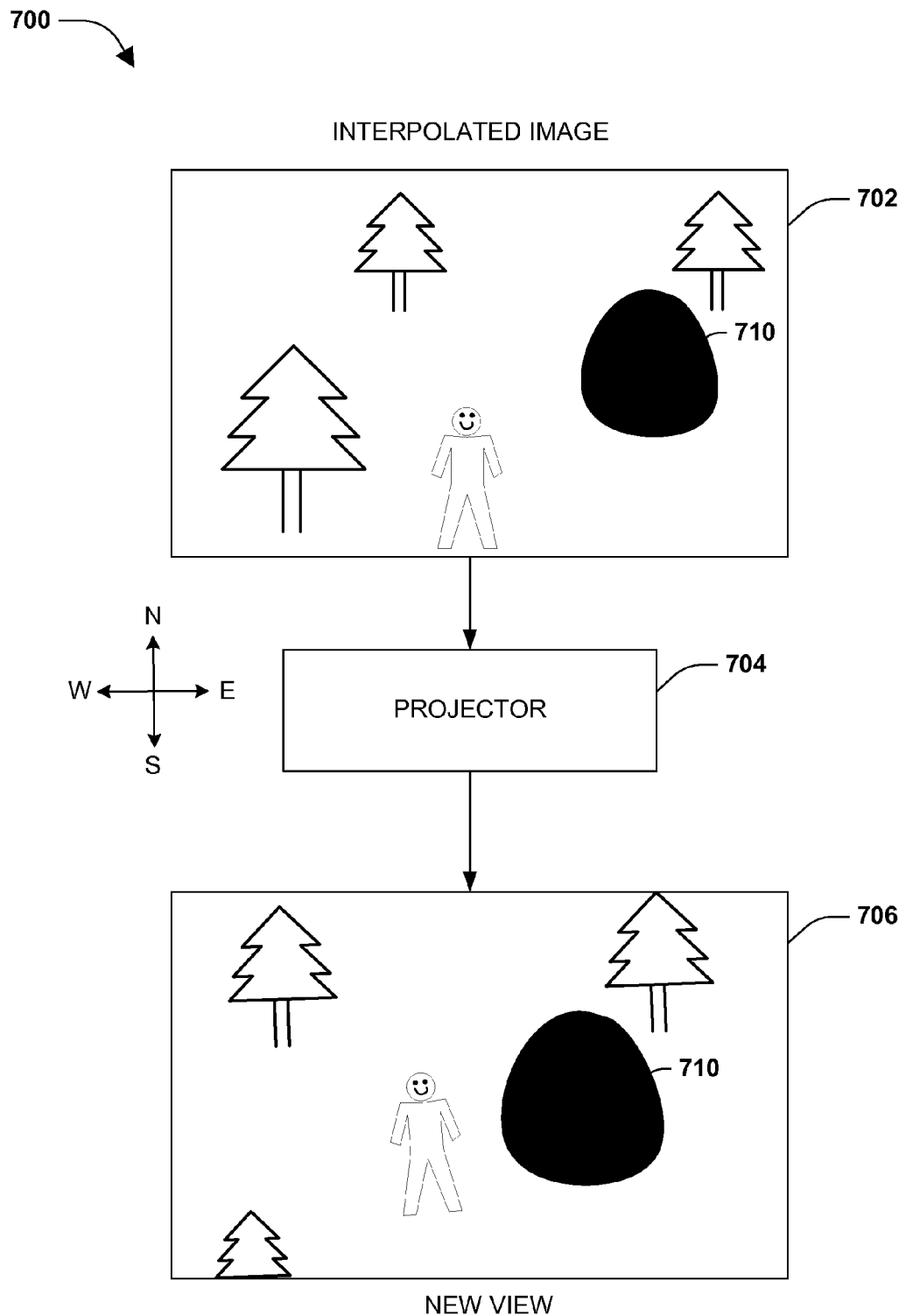
FIG. 7 is an illustration of an example of a projector generating a new view based upon an interpolated image.

FIG. 7 illustrates an example 700 of a projector 704 generating a new view 706 based upon an interpolated image 702. The interpolated image 702 may have points representing pixels. The points within the interpolated image 702 may be valued points having values or unvalued points having "interpolated" values, where the values represent depth, position, and/or 3D location data. It may be appreciated that the interpolated image 702 may be derived from an image depicting a scene of a person near a lake and three trees.

The projector 704 may be configured to project points from the interpolated image 702 to locations within the new view 706. In particular, values (e.g., depth, position, and/or 3D location data) of points may be used to determine projection locations within the new view 706. Additional information, such as a desired "camera" viewing angle, may be used to determine projection locations. In one example, the new view 706 may be a view of the person near the lake 710 and three trees at a new viewing angle. The new view may be a view of the scene where the person has walked north from the original location. For example, the new view may depict the person closer to the lake, but further from the southwest tree. Additionally, the new view may be depicted the scene from a different angle, as though a viewing camera was tilted counterclockwise. Thus, points from the interpolated image 702 may be projected onto the new view 706 to depict a view of the scene where the person has walked slightly north towards a lake and the camera view is slightly tilted counterclockwise.

Figure 8:
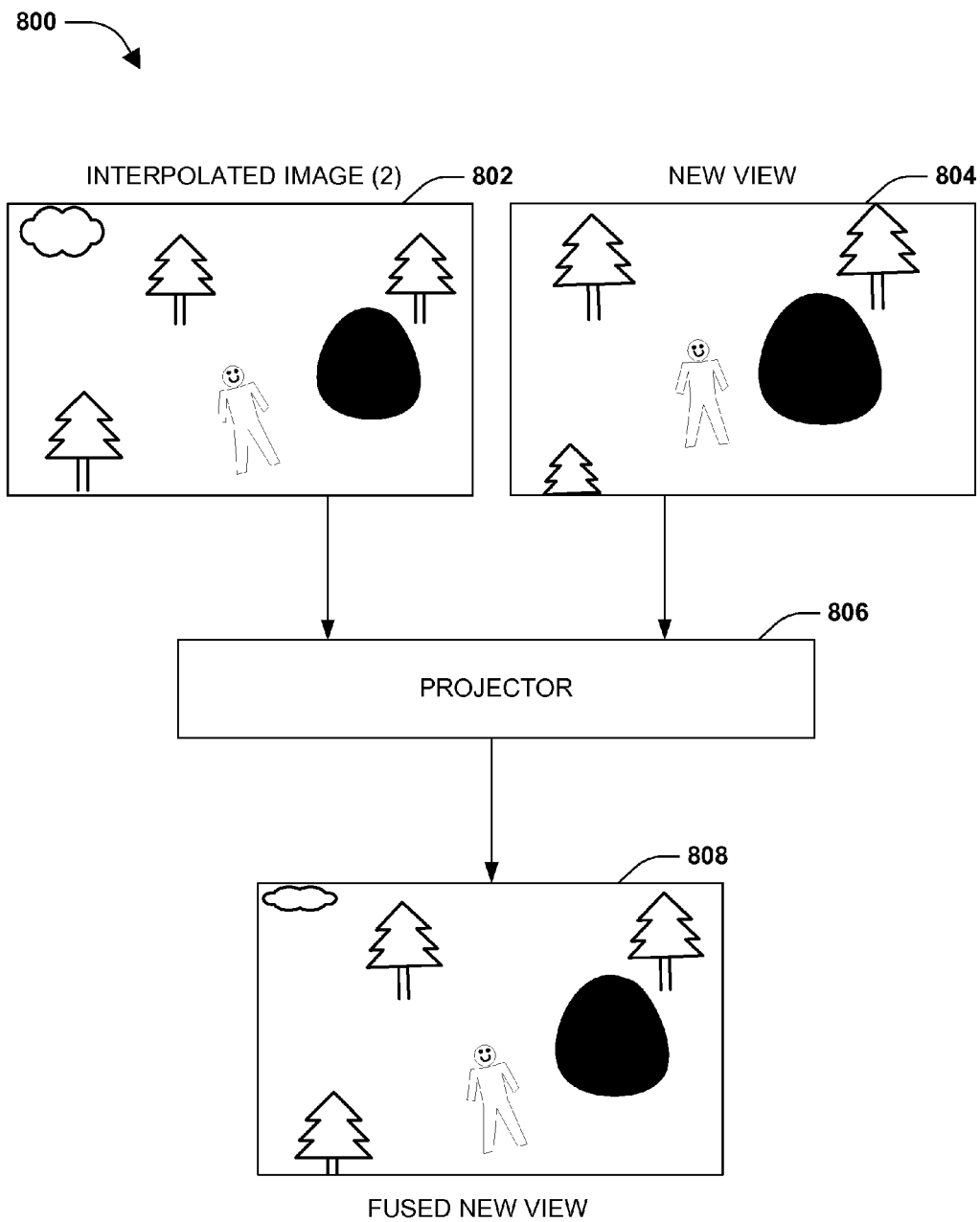
FIG. 8 is an illustration of an example of projector generating a fused new view based upon a second interpolated image and a new view.

FIG. 8 illustrates an example 800 of a projector 806 generating a fused new view 808 based upon a second interpolated image 802 and a new view 804. The new view 804 may be a view generated based upon a first interpolated image (e.g., new view 706 generated based upon an interpolated image 702 of FIG. 7). The projector 806 may be configured to project points within the second interpolated image 802 onto locations within the new view 804 to generate the new fused view 808.

In one example of fusing the second interpolated image 802 with the new view 804, points within the second interpolated image 802 may be projected onto locations within the new view 804 based upon values of the points within the second interpolated image 802. For example, a cloud may be depicted within the second interpolated image 802 by one or more points. However, the cloud may be absent from the new view 804. The projector 806 may project a "shrunken" version of the cloud onto the new view based upon values of the points corresponding to the cloud and/or additional information regarding desired attributes of the fused new view 808 (e.g., a desired viewing angle).

A northeast most tree may be depicted within the second interpolated image 802 in a location closer to the camera view point, than the northeast most tree's location within the new view 804. That is, the northeast most tree is depicted further down in the second interpolated image 802 than in the new view 804. The projector 806 may project the points associated with the tree onto the new view 804 based upon values of the tree and/or additional information regarding desired attributes of the fused new view 808. In this way, the fused new view 808 may depict the tree at a location between the location of the tree within the second interpolated image 802 and the new view 804.

Additionally, the viewing angle of the second interpolated image 802 is tilted more counterclockwise than the new view 804. The fused new view 808 may have a viewing angle corresponding to the second interpolated image 802 based upon a desired attribute of the fused new view 808 to have a more counterclockwise view. In this way, the fused new view 808 may be generated based upon projecting points from the second interpolated image 802 onto locations within the new view 804 to generate the fused new view 808.

Figure 9:
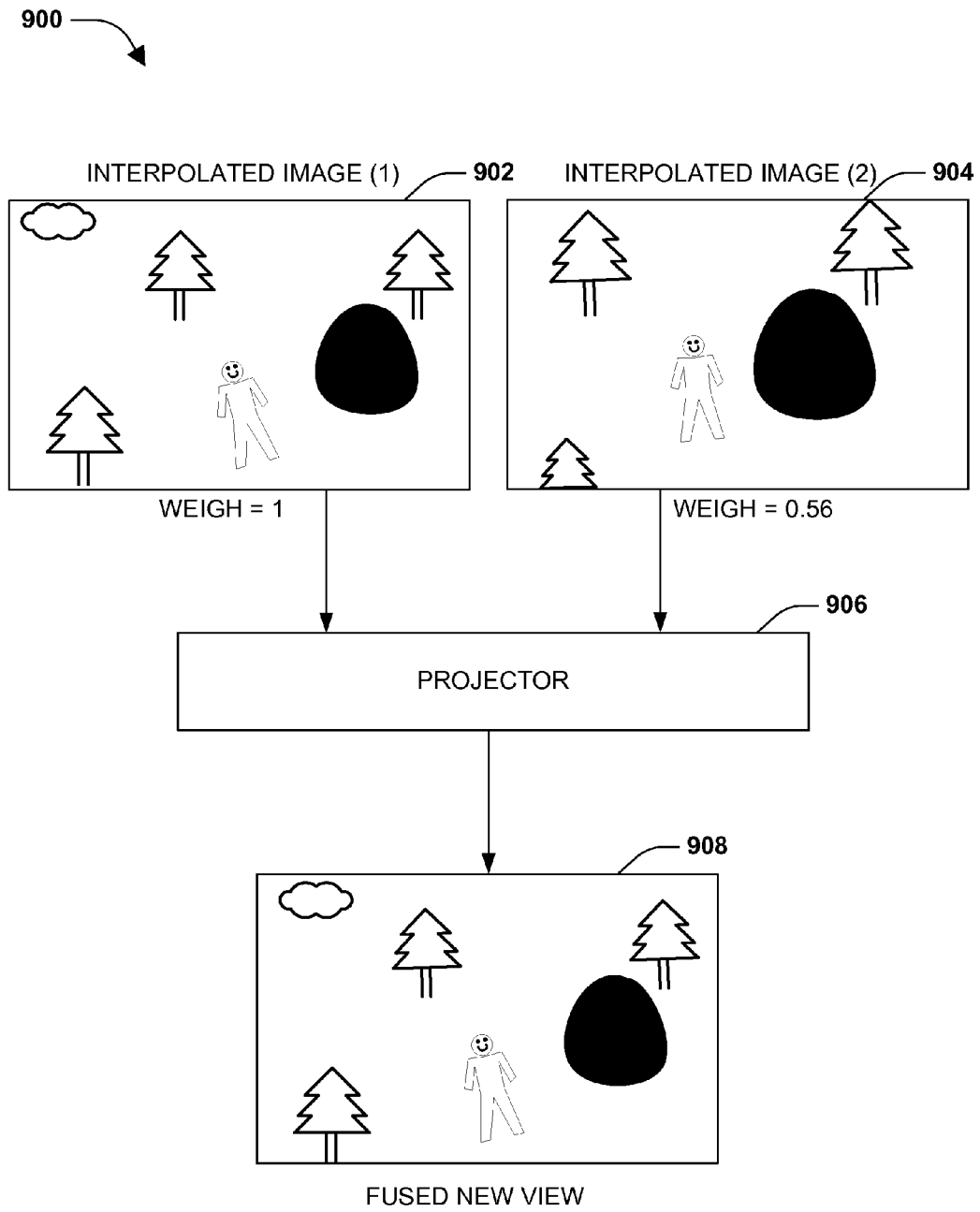
FIG. 9 is an illustration of an example of projector generating a fused new view based upon a first interpolated image and a second interpolated image.

FIG. 9 illustrates an example 900 of a projector 906 generating a fused new view 908 based upon a first interpolated image 902 and a second interpolated image 904. The projector 906 may be configured to project points within the first interpolated image 902 and the second interpolated image 904 onto locations of the new fused view 908.

In one example, a first value of a point within the first interpolated image 902 and a second value of the point within the second interpolated image 904 may be used to determine a location to project the point within the new fused view 908. Thus, a single projection of the point is performed by considering the first value and the second value when performing the projection.

In another example, a point within the first interpolated image 902 may be project onto a location within the fused new view 908 based upon a first value of the point. A second independent projection of the point may be performed based upon a second value of the point within the second interpolated image 904. Thus, points within the first interpolated image 902 may be project onto the fused new view 908, and then points within the second interpolated image 904 may be projected onto the fused new view 908. In this way, the projector 906 may merge the two projections to generate the final version of the fused new view 908.

The projector 906 may take into account weights assigned to the first interpolated image 902 and the second interpolated image 904. For example, a weight of 1 may be assigned to the first interpolated image 902 because the fused new view 908 may be highly relevant (e.g., close in time) to the view of the scene depicted by the first interpolated image 902. A weight of 0.56 may be assigned to the second interpolated image 904 because the fused new view 908 may be less relevant (e.g., further in time) to the view of the scene depicted by the second interpolated image 904. In this way, the projector 906 may give greater consideration of values of the first interpolated image 902, than values of the second interpolated image 904. For example, the entire cloud from the first interpolated image 902 may be projected into the fused new view 908, even though the cloud is absent from the second interpolated image 904. In this way, the fused new view 908 may be generated based upon values of points within interpolated images, where interpolated images and/or points therein have assigned weights.

Figure 10:
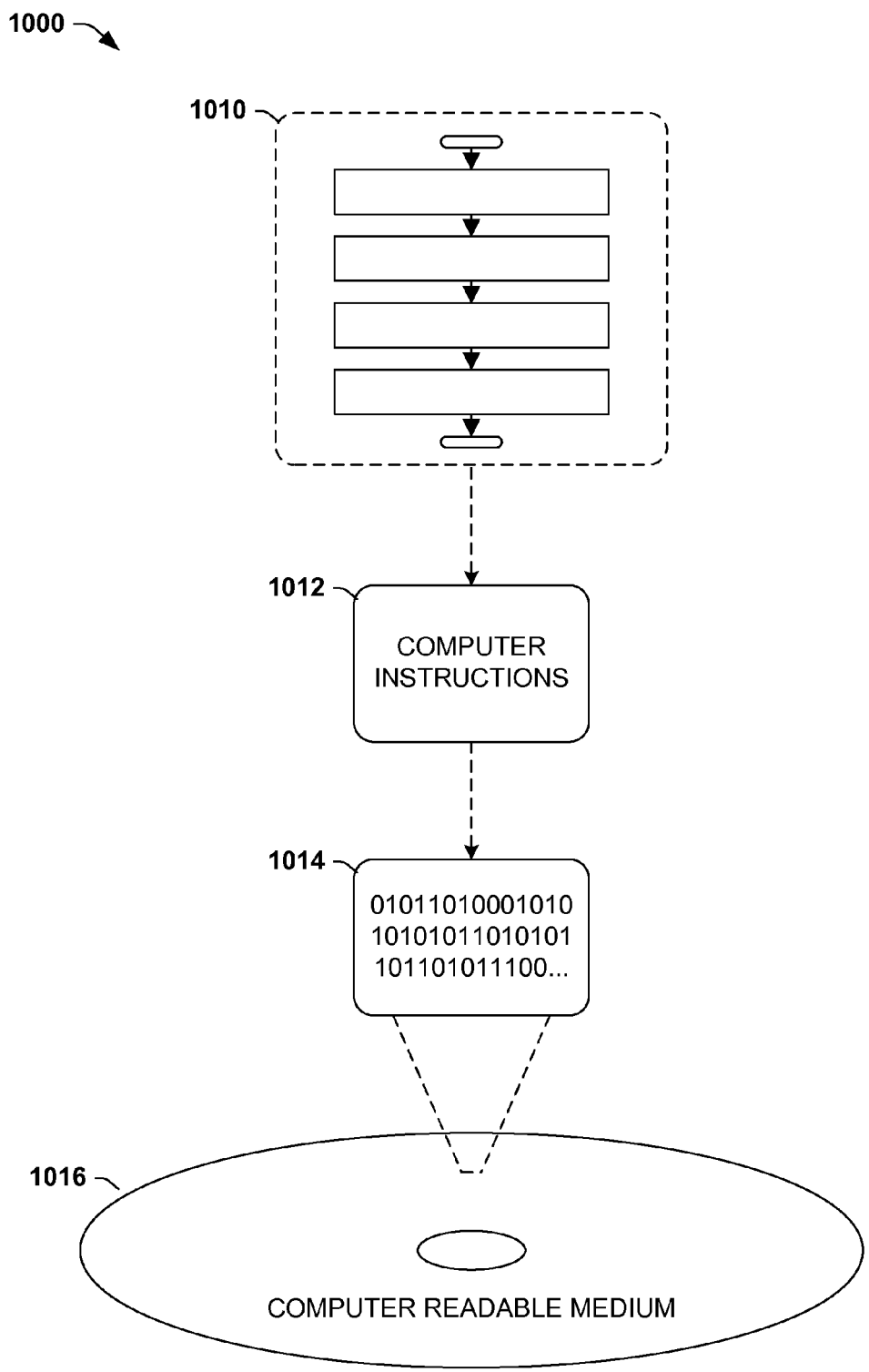
FIG. 10 is an illustration of an exemplary computer-readable medium wherein processor-executable instructions configured to embody one or more of the provisions set forth herein may be comprised.

Still another embodiment involves a computer-readable medium comprising processor-executable instructions configured to implement one or more of the techniques presented herein. An exemplary computer-readable medium that may be devised in these ways is illustrated in FIG. 10, wherein the implementation 1000 comprises a computer-readable medium 1016 (e.g., a CD-R, DVD-R, or a platter of a hard disk drive), on which is encoded computer-readable data 1014. This computer-readable data 1014 in turn comprises a set of computer instructions 1012 configured to operate according to one or more of the principles set forth herein. In one such embodiment 1000, the processor-executable computer instructions 1012 may be configured to perform a method 1010, such as the exemplary method 100 of FIG. 1, for example. In another such embodiment, the processor-executable instructions 1012 may be configured to implement a system, such as the exemplary system 200 of FIG. 2 and/or exemplary system 300 of FIG. 3, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 11:
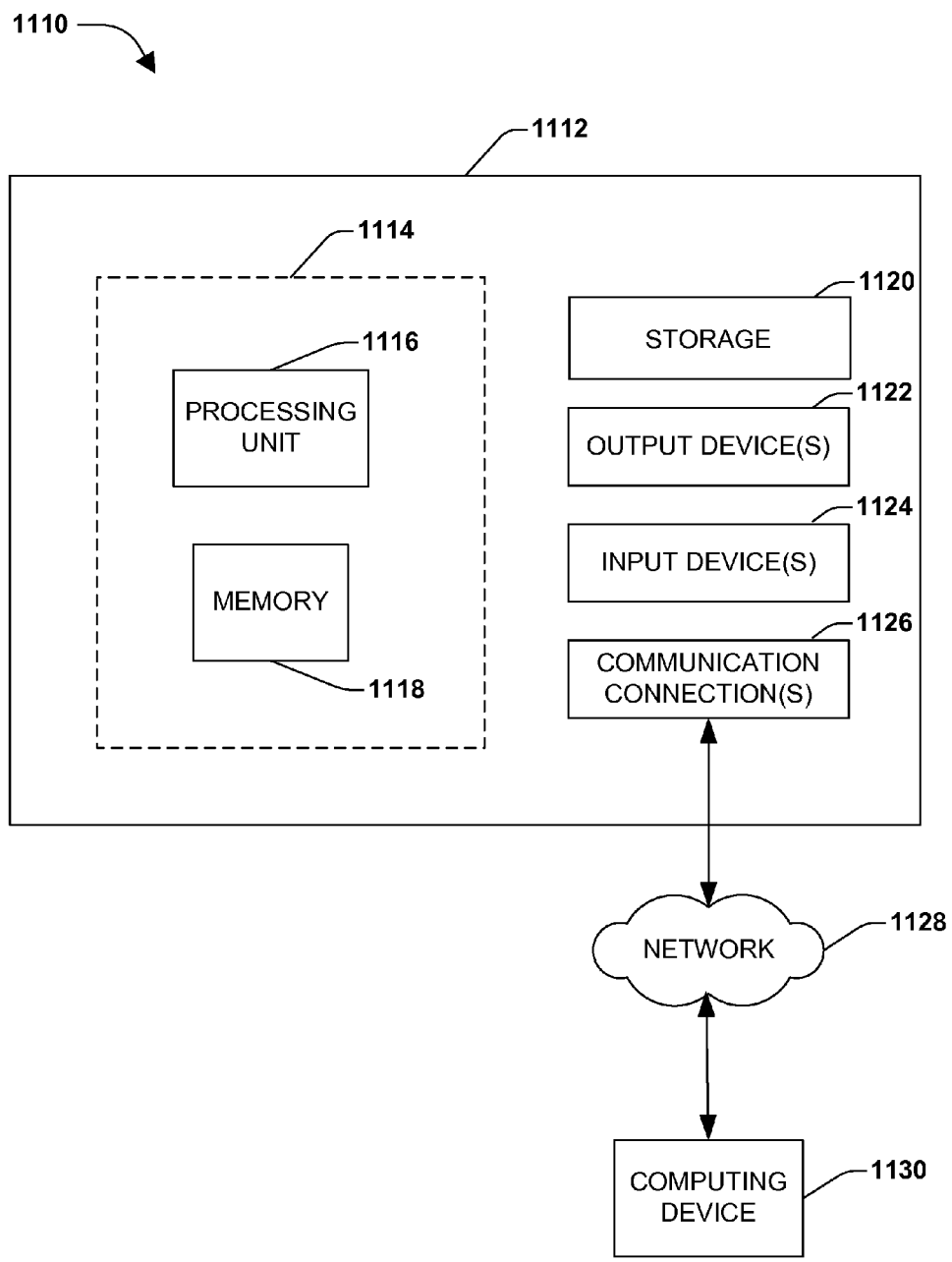
FIG. 11 illustrates an exemplary computing environment wherein one or more of the provisions set forth herein may be implemented.

FIG. 11 and the following discussion provide a brief, general description of a suitable computing environment to implement embodiments of one or more of the provisions set forth herein. The operating environment of FIG. 11 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 11 illustrates an example of a system 1110 comprising a computing device 1112 configured to implement one or more embodiments provided herein. In one configuration, computing device 1112 includes at least one processing unit 1116 and memory 1118. Depending on the exact configuration and type of computing device, memory 1118 may be volatile (such as RAM, for example), non-volatile (such as ROM, flash memory, etc., for example) or some combination of the two. This configuration is illustrated in FIG. 11 by dashed line 1114.

In other embodiments, device 1112 may include additional features and/or functionality. For example, device 1112 may also include additional storage (e.g., removable and/or non-removable) including, but not limited to, magnetic storage, optical storage, and the like. Such additional storage is illustrated in FIG. 11 by storage 1120. In one embodiment, computer readable instructions to implement one or more embodiments provided herein may be in storage 1120. Storage 1120 may also store other computer readable instructions to implement an operating system, an application program, and the like. Computer readable instructions may be loaded in memory 1118 for execution by processing unit 1116, for example.

The term "computer readable media" as used herein includes computer storage media. Computer storage media includes volatile and nonvolatile, removable and non-removable media implemented in any method or technology for storage of information such as computer readable instructions or other data. Memory 1118 and storage 1120 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1112. Any such computer storage media may be part of device 1112.

Device 1112 may also include communication connection(s) 1126 that allows device 1112 to communicate with other devices. Communication connection(s) 1126 may include, but is not limited to, a modem, a Network Interface Card (NIC), an integrated network interface, a radio frequency transmitter/receiver, an infrared port, a USB connection, or other interfaces for connecting computing device 1112 to other computing devices. Communication connection(s) 1126 may include a wired connection or a wireless connection. Communication connection(s) 1126 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1112 may include input device(s) 1124 such as keyboard, mouse, pen, voice input device, touch input device, infrared cameras, video input devices, and/or any other input device. Output device(s) 1122 such as one or more displays, speakers, printers, and/or any other output device may also be included in device 1112. Input device(s) 1124 and output device(s) 1122 may be connected to device 1112 via a wired connection, wireless connection, or any combination thereof. In one embodiment, an input device or an output device from another computing device may be used as input device(s) 1124 or output device(s) 1122 for computing device 1112.

Components of computing device 1112 may be connected by various interconnects, such as a bus. Such interconnects may include a Peripheral Component Interconnect (PCI), such as PCI Express, a Universal Serial Bus (USB), firewire (IEEE 13114), an optical bus structure, and the like. In another embodiment, components of computing device 1112 may be interconnected by a network. For example, memory 1118 may be comprised of multiple physical memory units located in different physical locations interconnected by a network.

Those skilled in the art will realize that storage devices utilized to store computer readable instructions may be distributed across a network. For example, a computing device 1130 accessible via a network 1128 may store computer readable instructions to implement one or more embodiments provided herein. Computing device 1112 may access computing device 1130 and download a part or all of the computer readable instructions for execution. Alternatively, computing device 1112 may download pieces of the computer readable instructions, as needed, or some instructions may be executed at computing device 1112 and some at computing device 1130.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method, comprising:
   interpolating, using a processing unit, a value for an unvalued point within an image based upon one or more values of one or more valued points within the image to generate an interpolated image, the interpolating comprising:
   determining a set of valued points comprising a first valued point, of the one or more valued points, and a second valued point, of the one or more valued points, the first valued point and the second valued point having one or more desired cost paths, the first valued point having a first value, the second valued point having a second value; and
   applying a model to the set of valued points to interpolate the value for the unvalued point; and
   projecting at least one of the unvalued point, the first valued point or the second valued point of the interpolated image to a location within a new view based upon at least one of the value for the unvalued point, the first value for the first valued point or the second value for the second valued point.

2. The method of claim 1, comprising:
   generating a second interpolated image;
   projecting a point of the second interpolated image to a second location within the new view to generate a fused new view.

3. The method of claim 2, comprising:
   assigning a weight to the point of the second interpolated image based upon at least one of a relevance measure, a time measure, a quality measure or a z-buffer; and generating the fused new view based upon the assigned weight.

4. The method of claim 1, at least one of the value, the first value or the second value comprising at least one of depth data, position data, or 3D location data.

5. The method of claim 1, the determining a set of valued points comprising:
determining a predetermined number (k) of valued points having desired low cost paths corresponding to one or more changes, below a threshold, in at least one of color, texture, gradient or reflectance.

6. The method of claim 1, the applying a model comprising at least one of:
interpolating the value for the unvalued point using an average of the first value of the first valued point, the second value of the second valued point and zero or more values of zero or more other valued points;
interpolating the value for the unvalued point using a plane intersecting at least one of the first valued point or the second valued point; or interpolating the value for the unvalued point using a geometric shape intersecting at least one of the first valued point or the second valued point.

7. The method of claim 1, the applying a model comprising:
removing one or more valued points within the set of valued points based upon the one or more valued points having outlier values.

8. The method of claim 1, the projecting comprising:
performing a forward mapping assignment of a color value associated with at least one of the unvalued point, the first valued point or the second valued point to a color value associated with the location.

9. The method of claim 1, the projecting comprising:
performing a backward mapping assignment of a depth value associated with at least one of the unvalued point, the first valued point or the second valued point to a depth value associated with the location.

10. The method of claim 1, the projecting comprising:
determining the location based upon one or more identified features between the image and the new view.

11. The method of claim 1, the interpolating comprising:
performing facial detection upon the image to determine one or more values of unvalued points.

12. The method of claim 1, comprising:
determining one or more values of at least one valued point based upon at least one of:
a user entered value;
a value from a stereo process; or
a value from a frame bundling process.

13. A system, comprising:
one or more processing units; and
memory comprising instructions that when executed by at least one of the one or more processing units implement at least some of:
an interpolator configured to interpolate a value for an unvalued point within an image based upon one or more values of one or more valued points within the image to generate an interpolated image, the interpolating comprising:
determining a set of valued points comprising a first valued point, of the one or more valued points, and a second valued point, of the one or more valued points, the first valued point and the second valued point having one or more desired cost paths, the first valued point having a first value, the second valued point having a second value; and
applying a model to the set of valued points to interpolate the value for the unvalued point; and
a projector configured to:
project at least one of the unvalued point, the first valued point or the second valued point of the interpolated image to a location within a new view based upon at least one of the value for the unvalued point, the first value for the first valued point or the second value for the second valued point.

14. The system of claim 13, the projector configured to:
project a point of a second interpolated image to a second location within the new view to generate a fused new view.

15. The system of claim 14, the projector configured to:
assign a weight to the second interpolated image based upon at least one of a relevance measure, a time measure, a quality measure or a z-buffer; and
generate the fused new view based upon the assigned weight.

16. The system of claim 13, the model comprising at least one of:
an average function;
a plane intersection function; or
a geometric shape intersection function.

17. The system of claim 13, the interpolator configured to:
determine a predetermined number (k) of valued points.

18. The system of claim 13, at least one value corresponding to a depth of a point within the image.

19. The system of claim 13, the projector configured to:
determine the location within the new view based upon one or more identified features between the image and the new view.

20. A computer readable medium, excluding communication media, comprising instructions that when executed perform a method, comprising:
interpolating a value for an unvalued point within an image based upon one or more values of one or more valued points within the image to generate an interpolated image, the interpolating comprising:
determining a set of valued points comprising a first valued point, of the one or more valued points, and a second valued point, of the one or more valued points, the first valued point and the second valued point having one or more desired cost paths, the first valued point having a first value, the second valued point having a second value; and
applying a model to the set of valued points to interpolate the value for the unvalued point; and
projecting at least one of the unvalued point, the first valued point or the second valued point of the interpolated image to a location within a new view based upon at least one of the value for the unvalued point, the first value for the first valued point or the second value for the second valued point.

* * * * *